US 6,621,788 B1

(12) United States Patent
Terasaki (10) Patent No.: US 6,621,788 B1
(45) Date of Patent: Sep. 16, 2003

(54) DUAL SVC SYSTEM FOR ATM DEVICE

(75) Inventor: Hiroshi Terasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/443,389

(22) Filed: Nov. 19, 1999

(30) Foreign Application Priority Data

Nov. 20, 1998 (JP) .......................................... 10-330369

(51) Int. Cl.[7] .............................................. G01R 31/08
(52) U.S. Cl. .................................. 370/220; 370/395.3
(58) Field of Search ........................ 370/216, 217–221, 370/225–228, 241, 242, 244, 248, 249, 250, 252, 395.1, 395.3, 395.31, 238, 237; 709/238, 239, 242; 714/100, 1, 2

(56) References Cited

U.S. PATENT DOCUMENTS

| | | | | | |
|---|---|---|---|---|---|
| 6,049,542 | A | * | 4/2000 | Prasad ......................... | 370/386 |
| 6,072,610 | A | * | 6/2000 | Kuroyanagi et al. ......... | 359/117 |
| 6,215,765 | B1 | * | 4/2001 | McAllister et al. .......... | 370/217 |
| 6,411,599 | B1 | * | 6/2002 | Blanc et al. ................. | 370/219 |
| 6,442,131 | B1 | * | 8/2002 | Kondo ........................ | 370/218 |
| 6,463,062 | B1 | * | 10/2002 | Buyukkoc et al. ........ | 370/395.1 |

FOREIGN PATENT DOCUMENTS

| | | |
|---|---|---|
| JP | 7-221767 | 8/1995 |
| JP | 10-84354 | 3/1998 |
| JP | 10-145374 | 5/1998 |

* cited by examiner

Primary Examiner—David Vincent
(74) Attorney, Agent, or Firm—Whitham, Curtis & Christofferson, PC (57) ABSTRACT

The dual SVC system of the present invention for an ATM device, an ATM switching device, or an ATM concentrator, has an active switch system and a standby switch system, for connecting ATM members through the SVC (switched virtual connection) and routing ATM information. A device for sending SVC information from the active switch system to the standby switch system in a real-time manner is provided. When switching from the active system to the standby system occurs, the transfer of the ATM information through the SVC is maintained without any interruption. The SVC connection information is sent from the active switch to the standby switch at the time of establishment or termination of a call in the active switch system.

7 Claims, 11 Drawing Sheets

DUAL SVC SYSTEM FOR ATM DEVICE

BACKGROUND OF THE INVENTION

1. Field of the Invention

The present invention relates to ATM (asynchronous transfer mode) network technology, and in particular, to a dual SVC (switched virtual connection) system for an ATM device.

This application is based on Japanese Patent Application No. Hei 10-330369, the contents of which are incorporated herein by reference.

2. Description of the Related Art

In an ATM device, VPI (virtual path identifier) logically allows establishment of 256 ATM connections per line, and VCI (virtual channel identifier) logically allows establishment of 65536 ATM connections per VPI. The maximum number of SVCs (switched virtual connections) depends on the call processing performance and the storage capacity for the internal resources of the ATM device, and has increased recently as the performance of ATM devices has improved.

While ATM devices, such as ATM switching devices and ATM concentrators, handle a number of connections per line, and provide ATM communication service using a number of lines, various dual SVC systems are implemented in the ATM devices. The conventional dual SVC systems have the problems described below.

Figure 8:
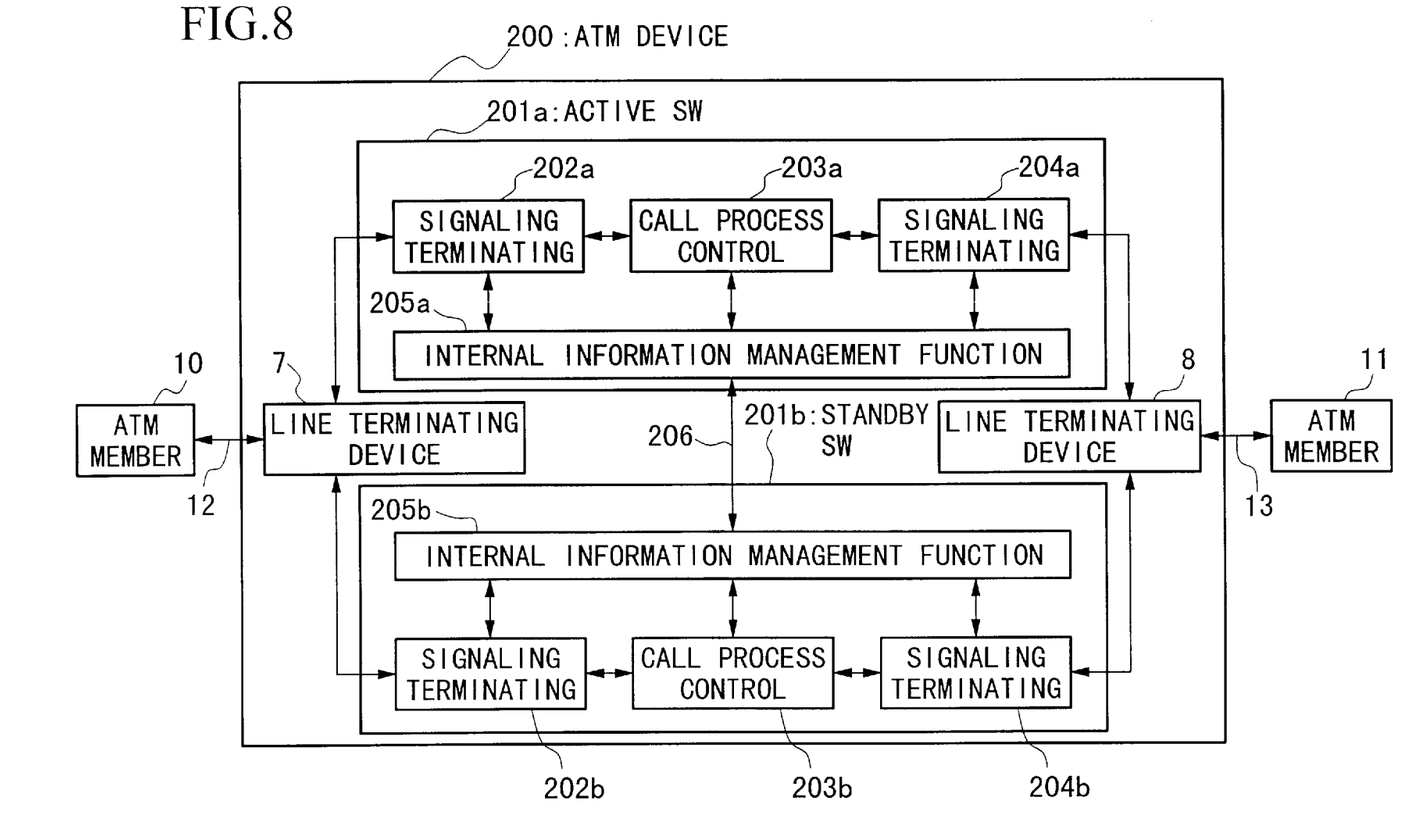
FIG. 8 is a block diagram showing the first example of the conventional dual SVC system.
Figure 9:
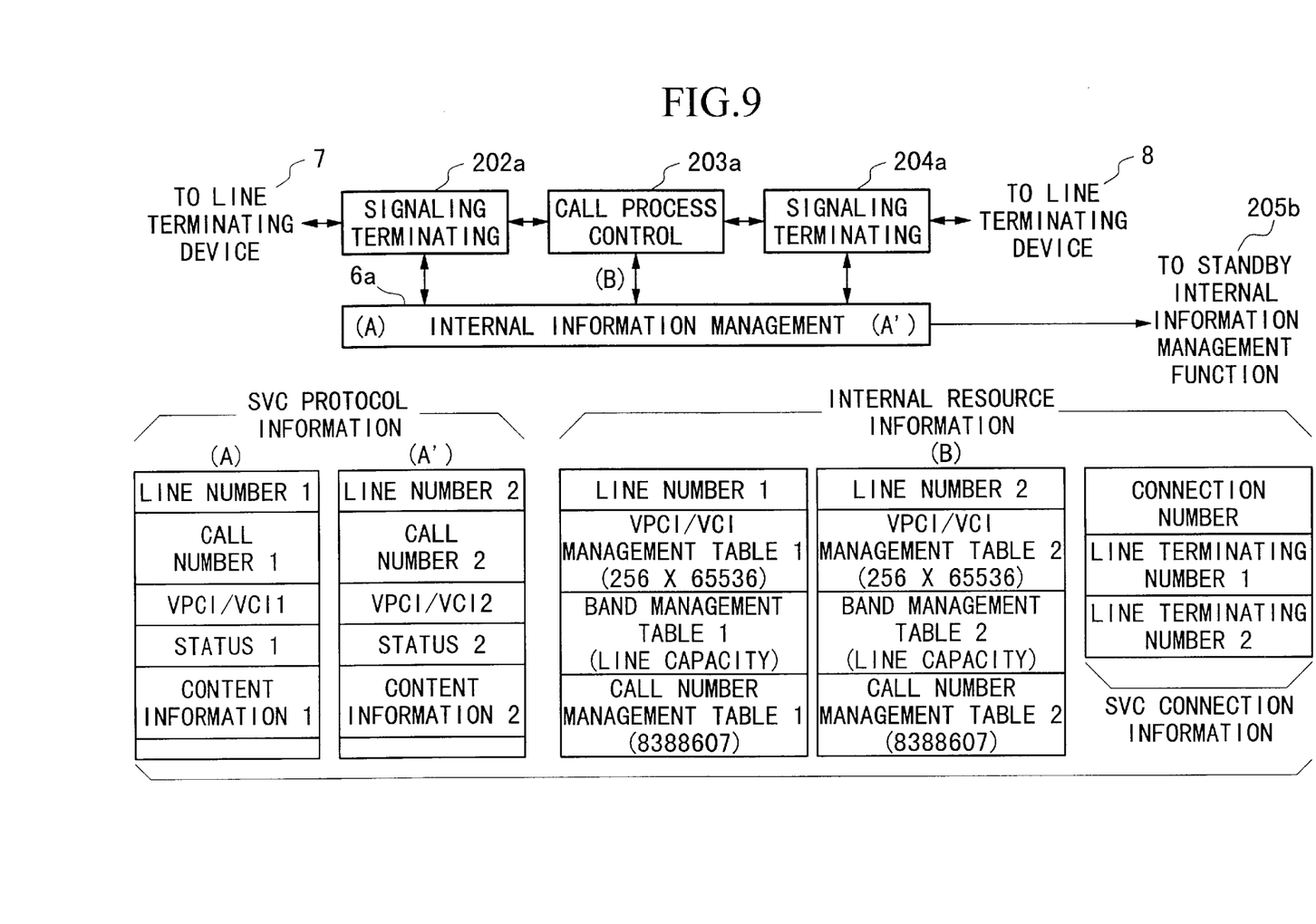
FIG. 9 is a diagram showing the data structure employed in the first example of the conventional dual SVC system.

FIG. 8 is a diagram showing an ATM device using a conventional dual SVC system, and FIG. 9 is a diagram showing the sequence operation of the conventional dual SVC system for handling the SVC protocol.

Referring to FIGS. 8 and 9, the ATM device 200 which includes the conventional dual SVC system is connected to ATM members 10 and 11 through the SVC connection.

The ATM member 10 is connected to the ATM device 200 through a line 12, and the ATM member 11 is connected to the ATM device 200 through a line 13.

The ATM device 200 comprises: line terminating devices 7 and 8; active and standby switches 201a and 201b; and an information exchange device 206 between the active system and the standby system. The active and standby switches 201a and 201b comprise: signaling terminating functions 202a, 202b, 204a, and 204b; call process control functions 203a and 203b; and internal information management functions 205a and 205b.

The call process control functions 203a and 203b hold routing setting information in the switches 201a and 201b.

The ATM device 200 using the dual SVC system operates as follows.

SVC signaling information from the line 12 is sent by the line terminating device 6 to the active signaling terminating function 202a, and is processed by the active signaling terminating function 202a and the active call process function 203a.

In this process, the signaling terminating function 202a and the call processcontrol function 203a continuously communicate with the active internal information management function 205a, obtain the internal resource information (B in FIG. 9) to execute the protocol procedure, and refer to the protocol information (A and A' in FIG. 9).

Further, the call process control function 203a performs routing in the active switch 201a based on the result of the above process, and sends this routing information to the active internal information management function 205a as the ATM connection information B.

The active internal information management function 205a periodically transmits the internal resource information which is updated when processing the SVC protocol, the SVC connection information (B in FIG. 9), and the SVC protocol information (A and A' in FIG. 9) to the standby internal information management function 205b through the information exchange device 206 as information for executing routing setting procedure.

This information is received by the standby internal information management function 205b.

The standby signaling terminating function 202b and the call process control function 203b communicate with the standby internal information management function 205b in a manner similar to the active system, to execute the protocol process.

Based on the result of the process, the standby call process control function 203b performs routing in the standby switch 201b. Thus, the same SVC connection is established in both active and standby systems.

Figure 10:
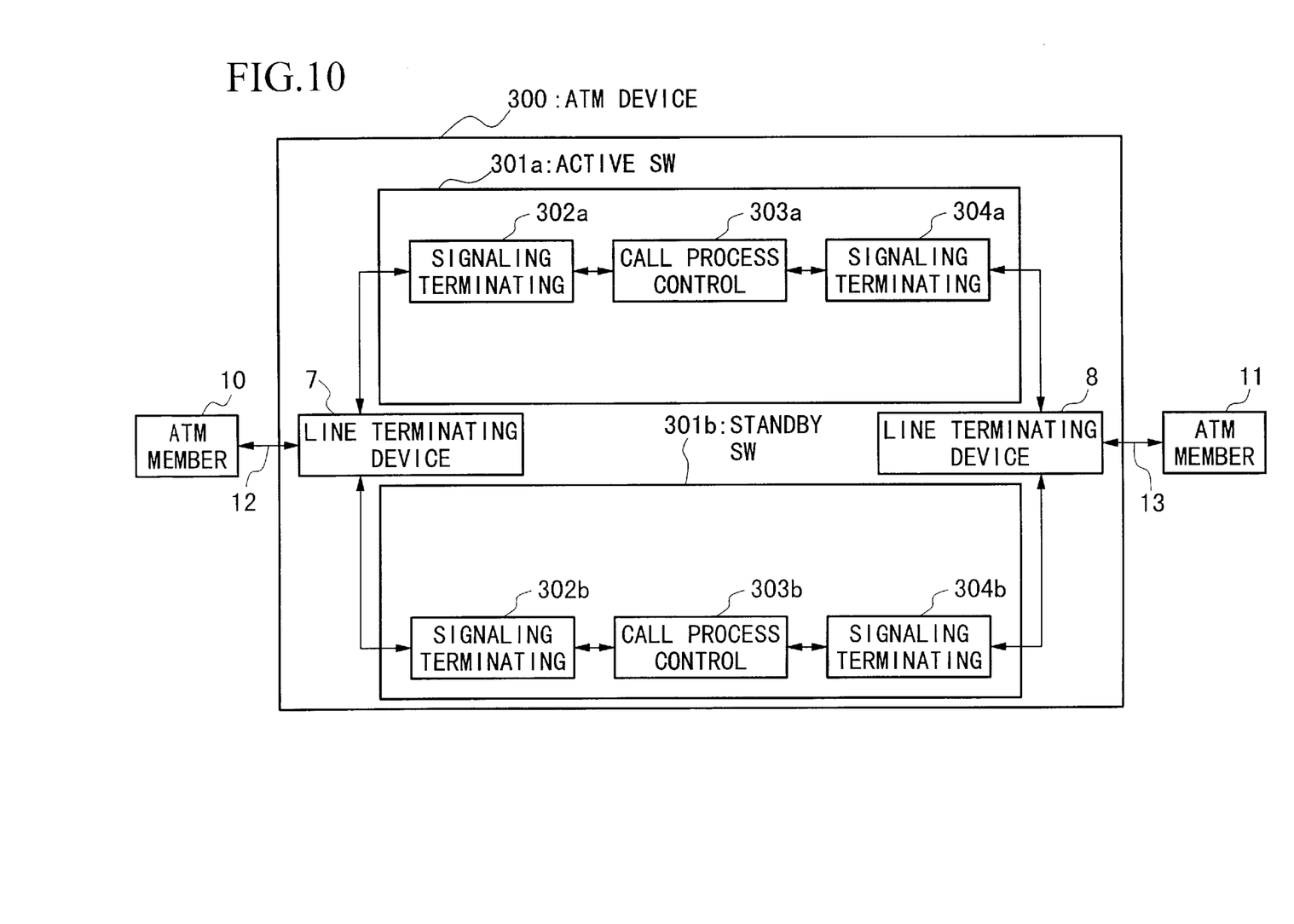
FIG. 10 is a block diagram showing the second example of the conventional dual SVC system.

FIG. 10 is a diagram showing the second example of the ATM device using the conventional dual SVC system.

Referring to FIG. 10, ATM members 10 and 11 are connected via an ATM device 300 through the SVC connection. The ATM member 10 is connected to the ATM device 300 through a line 12, and the ATM member 11 is connected to the ATM device 300 through a line 13.

The ATM device 300 comprises: line terminating devices 7 and 8; and active and standby switch 301a and 301b. The active and standby switches 301a and 301b comprise: signaling terminating functions 302a, 302b, 304a, and 304b; and call process control functions 303a and 303b.

The call process control functions 303a and 303b hold routing setting information in the switches 301a and 301b.

The ATM device 300 using the conventional dual SVC system operates as follows.

SVC signaling information from the line 12 is sent to both active and standby switches 301a and 301b by the line terminating device 7. The signaling information is simultaneously processed by active and standby signaling terminating functions 302a and 302b and by the call process control functions 303a and 303b.

As the result, the active and standby call process control functions 303a and 303b simultaneously perform routing in the active and standby switches 301a and 301b.

Thus, the active and standby systems have the same SVC connection information.

However, the first example of the conventional dual SVC system, explained with reference to FIG. 8, has the following problems.

The first problem is that, as the number of SVC connections increases, the normal process performance including the call process by the active system is degraded.

The reason for this is that the amount of transferred data is increased because the information periodically exchanged between the active system and the standby system contains the internal resource information, which includes all the SVC connection information of the established and running connections, and the SVC protocol information.

The second reason is that, when the information transfer rate between the active and standby systems is increased, the possibility of inconsistencies in the internal information between the active and standby systems is increased.

The reason for this is that the time lag, between the establishment of the connection in the standby system based on the internal information from the active system and the occurrence of a problem in the active system, is increased, and that the information of the established or released SVC connection may be lost due to the time lag.

The second example of the conventional dual SVC system, explained with reference to FIG. 10, has the following problems.

The first problem is that, while, when an accident occurs in one of the two systems, the parts where the accident occurred are exchanged and the recovered system is registered as the standby system, the synchronization in setting between the active systems and the recovered standby system cannot be achieved.

The reason for this is that the information of the ATM connection, which is established or terminated in the time period from the occurrence of the accident to the registration of the recovered standby system, cannot be exchanged between the active and standby systems because the information exchange device is not prepared.

Figure 11:
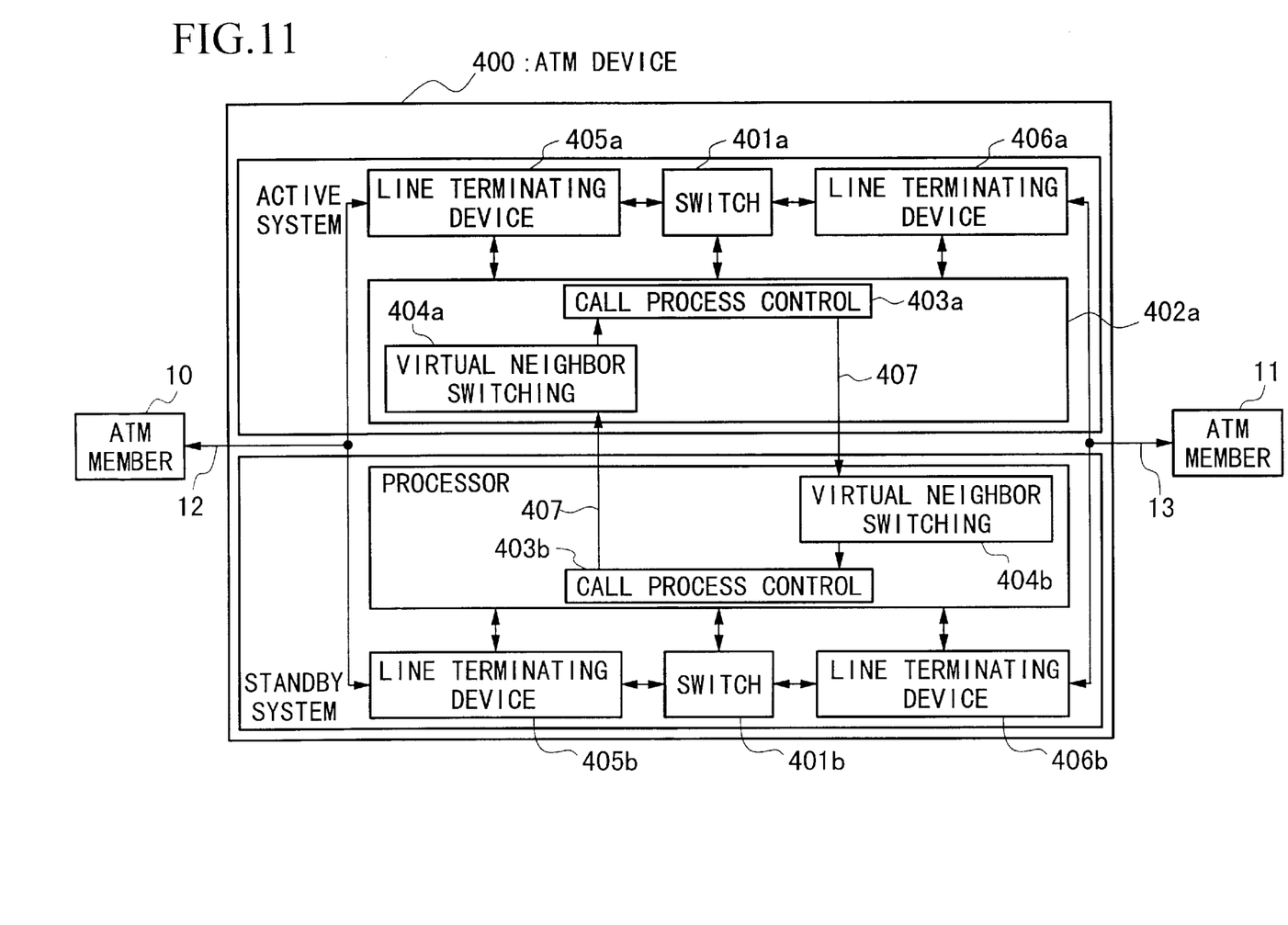
FIG. 11 is a block diagram showing the third example of the conventional dual SVC system.

FIG. 11 is a diagram showing the third example of the ATM device 400 using the conventional dual SVC system (disclosed in Japanese Patent Application, First Publication No. Hei 10-084354).

Referring to FIG. 11, ATM members 10 and 11 are connected via an ATM device 400 through the SVC connection. The ATM member 10 is connected to the ATM device 400 through a line 12, and the ATM member 11 is connected to the ATM device 400 through a line 13.

The ATM device 400, which includes an active system and a standby system, comprises: line terminating devices 405a, 405b, 406a, and 406b; switches 401a and 401b; processors 402a and 402b; and an information exchange device 407 between the active system and the standby system. The processors 402a and 402b comprise: call process control functions 403a and 403b; and virtual neighbors switching functions 404a and 404b.

All the SVC protocol process is executed by the processors 402a and 402b, and the SVC connection information is stored in the processors.

The processors 402a and 402b perform routing in the switches 401a and 401b based on the SVC connection.

In Japanese Patent Application, First Publication No. Hei 10-084354, the ATM device 400 using the conventional dual SVC system operates as follows.

The SVC signaling information from the line 12 is sent via the active line terminating device 405a to the active processor 402a, and is processed by the active call process control function 403a.

As the result, the active call process control function 403a performs routing in the active switch 401a, produces information which is required for the routing in the standby switch 401b, in a data structure using a short data length, and sends it to the standby system through the information exchange device 406.

This information is received by the virtual neighbor switching function 404b, is reproduced as SVC signaling information, and is sent to the standby call process control function 403b.

The standby call process control function 403b processes the reproduced signaling information in a manner similar to the active system, and performs routing in the standby switch 401b. Thus, the active and standby systems have the same SVC connection information.

Even when the number of connections is significantly increased in the third example of the conventional dual SVC system, the process time for the data transfer is not increased because the amount of data transfer between the active and standby systems is not increased, and the degradation of the process performance for the SVC protocol can be avoided.

Further, the interval between the data transfers between the active and standby systems is lengthened, and the possibility of inconsistencies in the SVC connection information between the active and standby systems is reduced.

The third example solves the difficulty in the synchronization of setting between the active and standby systems which arises in the second example shown in FIG. 10.

However, the third example of the conventional dual SVC system shown in FIG. 11 has the problems described below.

The first problem is that, as the number of calls increases, the performance in the call process is degraded.

The reason for this is that the structured data with the short data length, which includes only the information required for the routing, must be produced based on all the input SVC signaling information in a real-time manner by means of the call process module in the active and standby systems.

The second problem is that a special processor must be prepared to solve the first problem.

That is, the special processor produces the structured data with the short data length, which can be re-processed by the call process modules in the active and standby system and includes only the information required for the routing, in a real-time manner, preventing the degradation of the call process performance.

BRIEF SUMMARY OF THE INVENTION

It is therefore an object of the present invention to provide an ATM device using an improved dual SVC system which can maintain the transmission of the ATM main signal information between ATM members through the SVC without any interruption even when switching between an active system and a standby system is performed, and in which the active system and the standby system have the same routing setting information and SVC connection information in a real-time manner.

In order to accomplish the above object, the dual SVC system for an ATM device, an ATM switching device, or an ATM concentrator, has an active switch system and a standby switch system, for connecting ATM members through the SVC (switched virtual connection) and routing ATM information. A device for sending SVC information from the active switch system to the standby switch system in a real-time manner is provided. When switching from the active system to the standby system occurs, the transfer of the ATM information through the SVC is maintained without any interruption. The SVC connection information is sent from the active switch to the standby switch at the time of establishment or termination of a call in the active switch system.

The active and standby switch systems comprise: switches for routing ATM information which includes signaling information; first and second signaling terminating devices connected to the first and second line terminating devices; call process control devices; and storage devices. An information exchange device is provided between the active switch system and the standby switch system.

The call process control device of the active switch system associates the signaling terminating devices according to information which is contained in an SVC protocol message processed by the signaling terminating device and to call setting signal information which is defined within the system and is stored in the storage device.

The call process control device of the active switch system stores the association information in the storage device as established or released SVC connection information, performs routing in the active switch system, and sends the SVC connection information to the call process control device of the standby switch system through the information exchange device.

The call process control device of the standby switch device performs routing in the standby system, based on the SVC connection information which is sent from the call process control device of the active switch device through the information exchange device, and stores the SVC connection information in the storage device of the standby switch system.

The first advantage is that, even when, in the ATM switching device or other ATM device with the dual switches, switching between the active and standby systems arises for some reasons, i.e., due to an accident in the switch, the transmission of the ATM main signal information through the SVC between the ATM members can be maintained without any interruption. This improves the reliability of the ATM network service using the ATM switching device or the ATM concentrator.

As the second advantage, even when the number of calls or the number of SVC connections increases, the data transfer is carried out between the active and standby systems, preventing the degradation of the call process performance because the information exchanged between the active and standby systems is not all the internal resource information which includes the SVC protocol information and the SVC connection information, but only the SVC connection information, and an additional process is not required. Further, the data exchange between the active and standby systems is performed, not at the time of change in status of the SVC, but at the time of the establishment or release of the SVC.

DETAILED DESCRIPTION OF THE INVENTION

Figure 1:
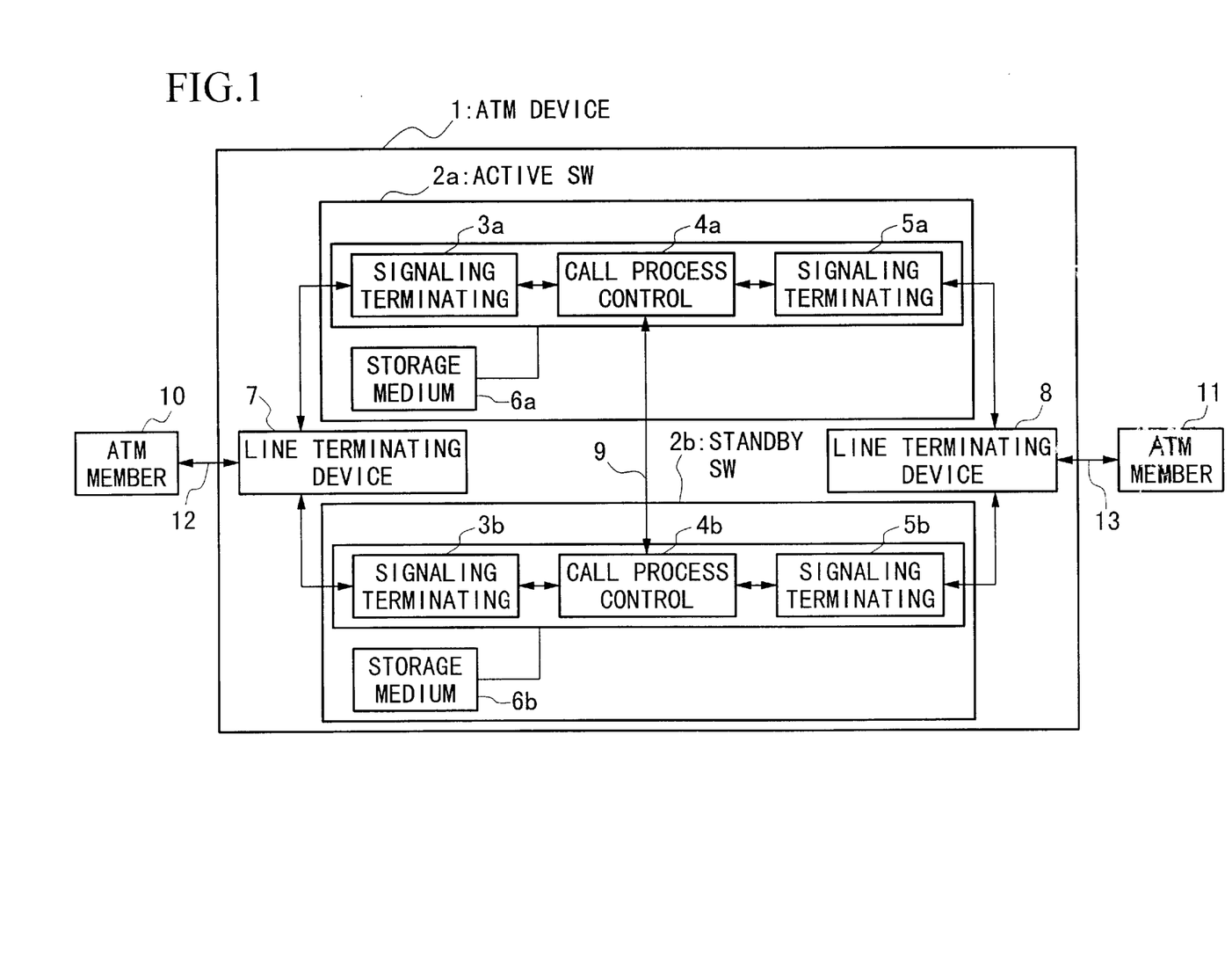
FIG. 1 is a block diagram showing the embodiment of the present invention.

The embodiment of the present invention will be explained below. Referring to FIG. 1, the dual SVC system for the ATM device of the present invention comprises: first and second line terminating devices 7 and 8 connected to first and second ATM members 10 and 11; and active and standby switch systems 2a and 2b. The active and standby switch systems comprise: switches for routing ATM information which contains signaling information; first and second signaling terminating devices 3a, 5a, 3b, and 5b connected to the first and second line terminating devices; call process control devices 4a and 4b; and storage devices 6a and 6b. The signaling terminating devices 3a and 5a in the active switch system execute the SVC protocol procedure while referring to and/or updating SVC signaling information which is sent to and received from the ATM members, call control signal information which is defined between the signaling terminating devices 3a and 5a and the call process control device in the active switch system, and SVC protocol information (A in FIG. 2) stored in the storage devices 6a. The signaling terminating devices in the standby switch system stops processes corresponding to the process performed by the signaling terminating device in the active switch system.

The call process control device 4a of the active switch system executes a call process while referring to and/or updating SVC signal information which is defined between the call process control device and the signaling terminating devices 3a and 5a, internal resource information (B in FIG. 2) stored in said storage device 6a, and SVC connection information, to thereby establish the SVC connections between one of the ATM member 10 and the first signaling terminating device 3a and between the other ATM member 11 and the second signaling terminating device 5a, or to thereby release the established SVC connections. Further, the call process control device 4a of the active switch system associates or disassociates the SVC connections between said ATM members 10 and 11 and the active switch system 2a, stores the association information in the storage device 6a of the active switch system as the SVC connection information (B in FIG. 2), performs routing in the active switch system based on the SVC connection information (B in FIG. 2), and sends the SVC connection information to the call process control device 4b of said standby switch system through an information exchange device 9.

The SVC connection information sent from the active switch system is received by the call process control device 4b of the standby switch system, routing in the standby switch system is performed based on the SVC connection information, and the SVC connection information in the storage device 6b of said standby switch system is updated. Thus, the active and standby switch systems have the same routing setting, and the storage devices of the active and standby switch systems have the same SVC connection information.

The embodiment of the present invention will be explained in more detail with reference to the figures. FIG. 1 is a schematic diagram showing the structure of the embodiment, and FIG. 2 is a diagram showing the data structure of the storage medium of the present invention.

Figure 2:
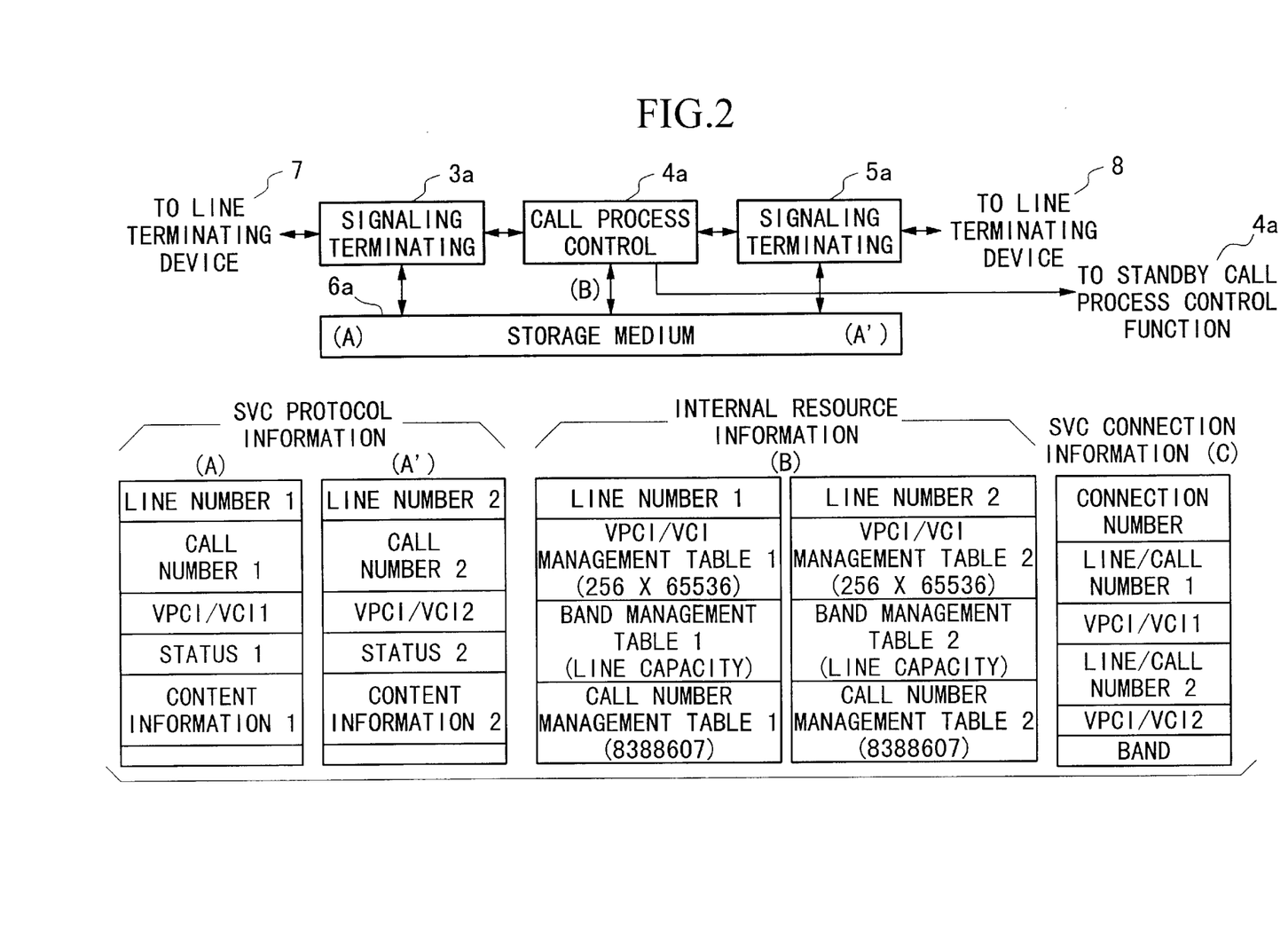
FIG. 2 is a diagram showing the data structure employed in the embodiment of the present invention.

Referring to FIGS. 1 and 2, in the dual SVC system for the ATM device, the line terminating devices 7 and 8 physically terminate the lines between the ATM members 10 and 11. The ATM members 10 and 11 send the ATM information which contains the signaling information. The line terminating devices 7 and 8 distribute the ATM information with the signaling information to the active and standby switches 2a and 2b. Also, the devices 7 and 8 receive the ATM information from both the active and standby switches 2a and 2b, and sends the ATM information only from the active switch 2a to the ATM members 10 and 11.

The switches 2a and 2b include ATM switches for routing the ATM information. The ATM switches comprise signaling terminating functions 3a, 3b, 5a, and 5b, call process control functions 4a and 4b, and storage media (storage devices) 6a and 6b. The storage media 6a and 6b are read and written by the active and standby switches 2a and 2b which include memories with drivers and controllers (not shown).

The routing function for the ATM information with the signaling information is to produce routing information using the call process control functions 4a and 4b based on the SVC connection information (C in FIG. 2) stored in the storage media 6a and 6b.

The active signaling terminating functions 3a and 5a read or update the SVC signaling information which is sent to and received from the ATM members 10 and 11, call control signal information which is beforehand defined between the signaling terminating functions 3a and 5a and the call process control function 4a, and SVC protocol information (A and A' in FIG. 2) stored in the storage media 6a. Then, the signaling terminating functions 3a and 5a executes the SVC protocol procedure.

At that time, the standby signaling terminating functions 3b and 5b stop all the process.

The active call process control function 4a reads or updates signaling information defined between the call process control function 4a and the signaling terminating function 3a and 5a, internal resource information (B in FIG. 2) stored in the storage medium 6a, and the SVC connection information (C in FIG. 2). Then, the function 4a executes the call process to establish the SVC connections between the ATM member 10 and the signaling function 3a and between the ATM member 11 and the signaling function 5a or to release (terminate) the established SVC connections.

The active call process function 4a assigns a header (VPCI/VCI) resource, a band resource, and an identifier number resource to each SVC connection according to the internal resource information (B in FIG. 2) stored in the storage medium 6a, and updates the internal information resource. When terminating the call connection, the function 4a terminates the SVC connection and updates the internal resource information (B in FIG. 2) in the storage medium 6a.

Further, the active call process control function 4a associates and disassociates the SVC connections which connect the active switch 2a and the ATM members 10 and 11. The function 4a stores the association as the SVC connection information (C in FIG. 2), performs the routing in the active switch 2a, and transfers the SVC connection information (C in FIG. 2) to the call process control function 4b via an information exchange device 9.

Thus, the ATM members 10 and 11 are connected through the SVC connection or are disconnected.

The SVC connection information C is received by the standby call process control function 4b, which then performs the routing in the standby switch 2b, and updates the connection information in the storage medium 6b.

The active switch 2a and the standby switch 2b have the same routing setting, and the active storage medium 6a and the standby storage medium 6b have the same SVC connection information.

When the connection is switched from the active switch to the standby switch for some reason, the transfer of the ATM information is maintained without any interruption because the routing in the switch 2b, which was in the standby state, is identical to that in the switch 2a which was active.

While the SVC protocol information (A and A' in FIG. 2) for the signaling terminating functions 3a and 5a and the internal resource information (B in FIG. 2) for the call process control functions 4a and 4b are continuously updated and stored in the storage medium 6a, this information is not sent to the standby side.

This information is not necessary once the SVC connection is established or released. Therefore, when the connection is switched to the standby system which does not receive these information, there is no effect on the established or released SVC connection.

As described above, in the ATM switching device with dual switches, the active switch does not send the SVC protocol status information but sends only the SVC connection information to the standby switch in a real-time manner. When the switching between the active system and the standby system occurs, the service using the SVC can be maintained, thereby enhancing the reliability of the ATM network service using the ATM switching devices or the ATM concentrator.

Because data are exchanged between the active and standby systems only at the time of the establishment or termination of the call and this exchanged data is the SVC connection information, the time required for the data transfer between the active and standby systems can be shortened. Because no conversion or other process for the data is not required, the effect on the call function by the active system can be minimum when the number of calls or connections is increased.

This invention will be described in further detail by way of an example.

In FIGS. 1 and 2, the example of the dual SVC system comprises: the ATM device 1 controlled by the program, the line terminating devices 7 and 8, the switches 2a and 2b, the signaling terminating functions 3a, 3b, 5a, and 5b, the call process control functions 4a and 4b, the storage medium 6a and 6b, and the information exchange device 9 between the active switch 2a and the standby switch 2b.

The ATM device 1 includes the line terminating device 7 and 8, the switches 2a and 2b, and the information exchange device 9 between the active and standby systems. The switch 2a includes the signaling terminating functions 3a and 5a, the call process control function 4a, and the storage medium 6a. The switch 2b includes the signaling terminating functions 3b and 5b, the call process control function 4b, and the storage medium 6b. The line terminating devices 7 and 8 are connected to the ATM members 10 and 11 through the line 12 and 13. These devices and functions are operated according to the process described below.

The ATM device 1 establishes the SVC connections with the ATM members 10 and 11 according to the request to establish the SVC and terminates the SVC connections. The line terminating devices 7 and 8 receive the ATM information, which includes the signaling information, from the ATM members 10 and 11 through the lines 12 and 13, and send the ATM information to both the active and standby switches 2a and 2b. Further, the line terminating devices 7 and 8 receive the ATM information from both the active and standby switches 2a and 2b and send the ATM information only from the active switch 2a to the ATM members 10 and 11 through the lines 11 and 13.

The switches 2a and 2b performs routing of the ATM information from the ATM members 10 and 11 based on the header information contained therein.

The signaling terminating functions 3a, 3b, 5a, and 5b perform the terminating process for the signals according to the signaling protocol, which is defined in ITU-T Q.2931 or ATM FORUM UNI, for the ATM members 10 and 11.

According to the information which is contained in the SVC protocol message to be processed by the signaling terminating functions 3a, 3b, 5a, and 5b, and to the call set signal which is defined beforehand, the call process control functions 4a and 4b associate two of the signaling terminating functions 3a, 3b, 5a, and 5b. The active call process control function 4a records or deletes this association information as the established or released SVC connection information C in the storage medium 6a, performs the routing in the active switch 2a based on the updated information, and transfers the SVC information to the standby call process control function 4b through the information exchange device 9 in a real-time manner.

Based on the SVC connection information from the active call process control function 4a, the standby call process control function 4b performs the routing in the standby switch 2b, and at the same time records the SVC connection information in the storage medium 6b.

The entire function of the embodiment will be explained with reference to FIGS. 1 to 3 and the sequence flow of FIG. 4.

Referring to FIGS. 1 and 2, the line terminating devices 7 and 8 are connected to the ATM members 10 and 11 through the lines 12 and 13, distribute the ATM information, which contains the signaling information, from the ATM members 10 and 11 to the active and standby switches 2a and 2. Further, the line terminating devices 7 and 8 receive the ATM information from both active and standby switches 2a and 2b, and send the ATM information only from the active switch 2a to the ATM members 10 and 11. Based on the header information in the ATM information from the line terminating devices 7 and 8, the switches 2a and 2b extract and insert the signaling information using the signaling terminating functions 3a, 3b, 5a, and 5b, and route the ATM main information, other than the signaling information, from the line terminating devices 7 and 8.

The signaling terminating functions 3a, 3b, 5a, and 5b in the switches 2a and 2b, when they are in the active state, process the SVC protocol message information between the ATM members 10 and 11, the call process signal information which is defined beforehand between the signaling terminating functions 3a, 3b, 5a, and 5b and the call process control functions 4a and 4b, and the SVC protocol information (A and A' in FIG. 2) stored in the storage media 6a and 6b, according to the procedure of the ITU-T Q.2931 or ATM FORUM UNI.

On the other hand, the standby system stops its protocol procedure.

Based on the call control signal, which is defined beforehand in the signaling terminating functions 3a, 3b, 5a, and 5b, and on the internal resource information (B in FIG. 2) stored in the storage media 6a and 6b, the call process control functions 4a and 4b, which is the upper layer of the signaling terminating functions 3a, 3b, 5a, and 5b, when in the active state, associate or disassociate two of the signaling terminating functions 3a, 3b, 5a, and 5b, and perform the routing in the switches 2a and 2b.

Thus, the SVC connection is established or released between the two line terminating devices 7 and 8.

Whenever the SVC connection is established or released, the call process control functions 4a and 4b stores the SVC connection information (C in FIG. 2) in the storage media 6a and 6b, and transmit the information to the other standby call process control functions 4a and 4b through the information exchange device 9.

The standby system receives the SVC connection information C from the active call process control functions 4a and 4b, performs the routing in the switches 4a and 4b, and stores the information in the storage media 6a and 6b.

Next, the present invention will be explained specifically via an example. Below is the description of the function to establish the SVC connection from the ATM member 10 to the ATM member 11.

Figure 3:
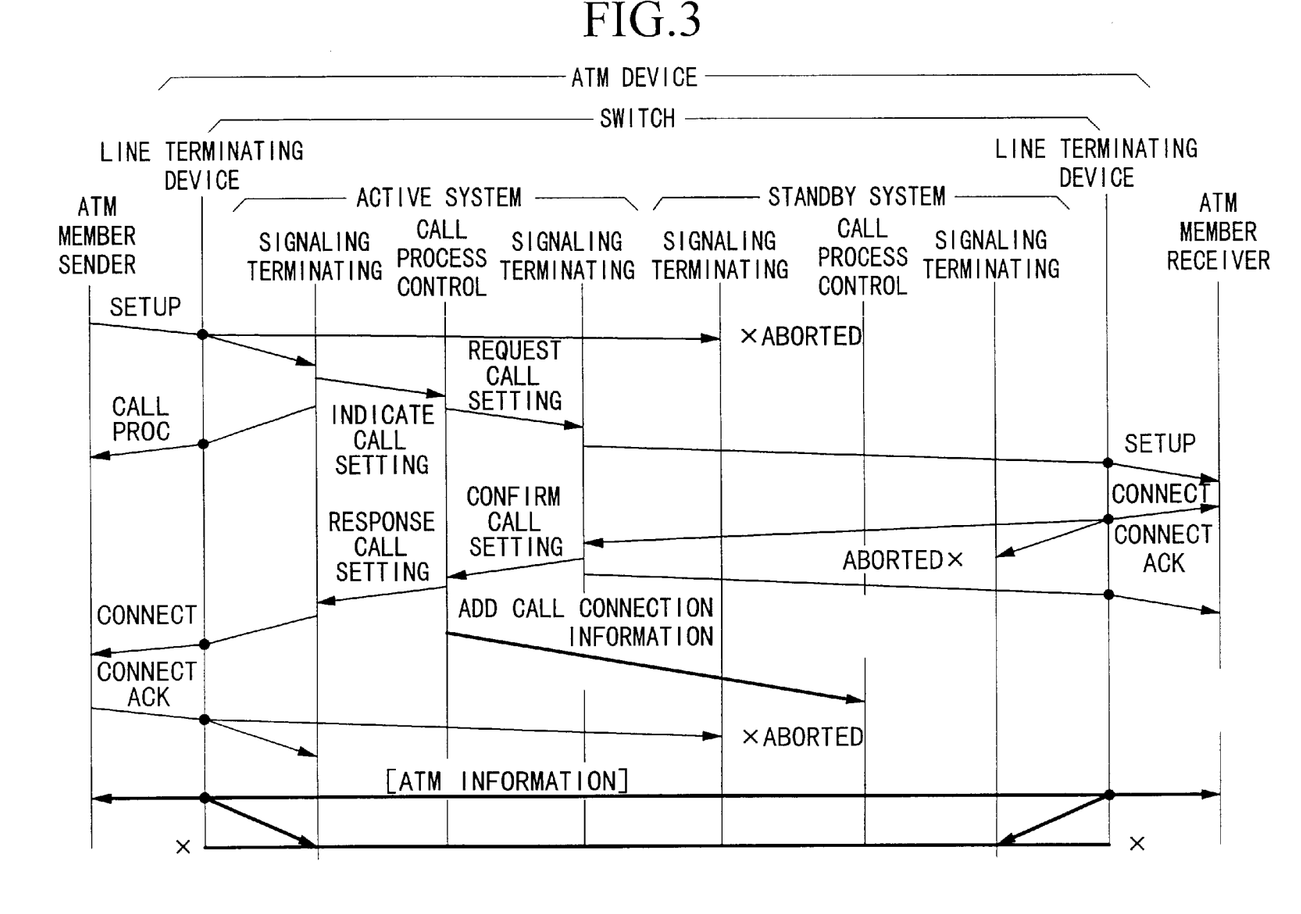
FIG. 3 is a diagram showing the first sequence for explaining the operation of the embodiment of the present invention.

Referring to FIGS. 1 to 3, the ATM member sends the SETUP message (request to set the call), and the line terminating device 7 sends the message to both active and standby switches 2a and 2b.

Based on the header information contained in the message, the active and standby switches 2a and 2b route the SETUP message from the line terminating device 7 to the signaling terminating functions 3a and 3b.

The SETUP message is not processed in the standby system because the signaling terminating function 3b in the standby switch 2b has had its protocol procedure stopped.

The signaling terminating function 3a in the active switch 2a terminates the SETUP message, and performs the protocol procedure while reading and updating the SVC protocol information (A in FIG. 2) stored in the storage medium 6a. As the result, the signaling terminating function 3a converts the message into a "call setting indication" signal and sends it to the call process control function 4a.

To set the SVC between the ATM member 10 and the active switch 2a based on the call setting indication signal, the call process control function 4a assigns the header (VPCI/VCI) resource, the band resource, and the SVC identifier number resource to the SVC, while referring to the internal resource information (B in FIG. 2) stored in the stored in the storage medium 6a in the active system. Then, the call process control function 4a stores the assignment in the storage medium 6a as a part of the internal resource information, and selects the signaling terminating function 5a connected to the ATM member 11 who is the connection target, and sends a "call setting request" signal thereto.

The signaling terminating function 5a terminates the call setting request signal, performs the process according to the standard protocol procedure while referring to and updating the SVC protocol information (A in FIG. 2) stored in the storage medium 6a, converts the signal into the SETUP message, and sends it to the line terminating device 8.

The line terminating device 8 sends the SETUP message from the active signaling terminating function 5a to the ATM member 11.

The ATM member 11 receives the SETUP message which is sent from the ATM member 10, and responds with a CONNECT message to establish the connection.

The CONNECT message from the ATM member 11 is sent in a reverse route from that described above, that is, from the line terminating device 8 to both active and standby switches 2a and 2b.

Both active and standby switches 2a and 2b route the CONNECT message to the signaling terminating functions 5a and 5b based on the header information contained in the message.

The CONNECT message is not processed by the signaling terminating function 56 in the standby system because the signaling terminating function 5b in the standby switch 2b has had its process stopped.

The signaling terminating function 5a in the active switch 2a terminates the CONNECT message, performs the process according to the standard protocol procedure while referring to and updating the SVC protocol information (A' in FIG. 2) stored in the storage medium 6a, converts the message into a "call setting confirmation" signal, and sends it to the call process control function 4a.

To set the SVC between the ATM member 11, which is the connection target, and the active switch based on the call setting confirmation, the call process control function 4a assigns the header (VPCI/VCI) resource, the band resource, and the call number resource to the SVC while referring to the internal resource information (B in FIG. 2) stored in the storage medium of the active system, and stores the assignment in the storage medium 6a as a part of the internal resource information. At the same time, the call process control function 4a associates the stored information with the internal resource information of the SVC for the ATM member 10 which has been already stored in the storage medium 6a, produces the SVC connection information (C in FIG. 2), and performs the routing in the active switch. The SVC connection information (C in FIG. 2) includes the connection number, and the line/call number 1, VPC1/VCI1, line/call number 2, VPC2/VCI, and the band information which relate to the lines 12 and 13.

At this point, the SVC connection is established between the ATM member 10 and the ATM member 11. The active call process control function 4a stores the SVC connection information C in the storage medium 6a, and sends the SVC connection information C together with an "additional call connection" command to the standby call process control function 4b through the information exchange device 9.

After that, the call process control function 4a sends a "call setting response" signal, which is a response to the call setting indication signal, to the signaling terminating function 3a.

The signaling terminating function 3a terminates the call setting response signal, executes the standard protocol procedure while referring to and updating the SVC protocol information (A in FIG. 2) stored in the storage medium 6a, converts the signal into the CONNECT message, and sends it to the line terminating device 7.

The line terminating device 7 selects only the CONNECT message from the active signaling terminating function 2a, and sends it to the ATM member 10. The ATM member 10 recognizes the establishment of the SVC connection with the ATM member 11 based on the CONNECT message, and starts sending and receiving information through the SVC connection.

The standby call process control function 4b receives a command to "add the call setting information" from the active call process control function 4a, performs the outing setting in the standby switch 2b based on the SVC connection information C, and adds the SVC connection information C to the storage medium 6b.

When the connection is switched from the active system to the standby system for some reason, the SVC connection is maintained because the routing setting in the switch 2b, which was initially standby, is identical to that in the switch 2a, which was initially active. Therefore, the service for communication of the ATM information between the ATM members 10 and 11 can be maintained without any interruption when the system is switched.

The SVC protocol information A and A' and the internal resource information B in the storage medium 6a is continuously updated by the signaling terminating functions 3a and 5a, but the update is not sent to the standby system.

This updated information is not necessary once the SVC connection is established. Therefore, when the connection is switched to the standby system which does not have the updated information, there is no effect on the established SVC connection.

Next, the disconnection of the SVC connection from the ATM member 10 to the ATM member 11 will be explained.

Figure 4:
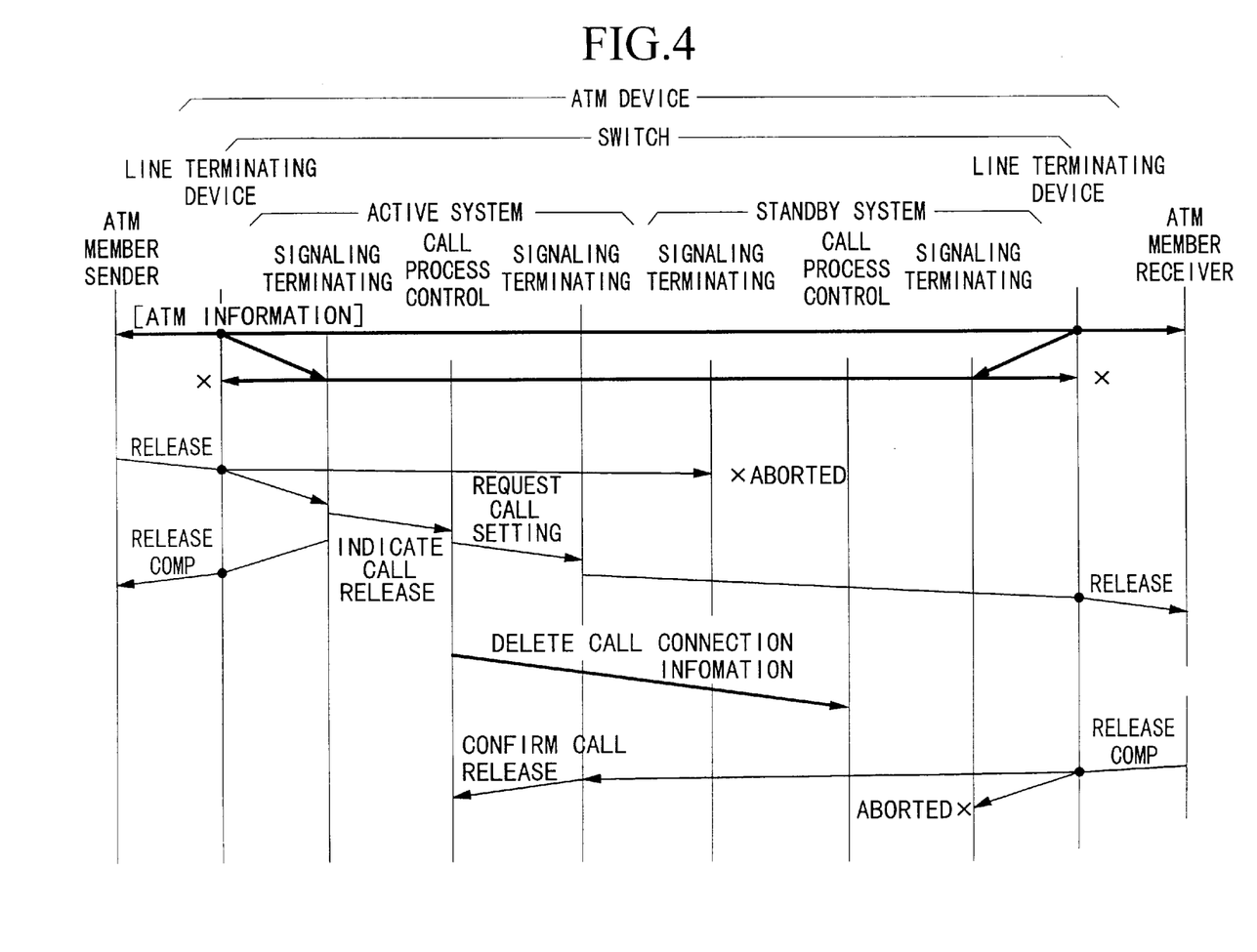
FIG. 4 is a diagram showing the second sequence for explaining the operation of the embodiment of the present invention.

Referring to FIGS. 1, 2, and 4, the ATM member 10 sends a RELEASE message (release request message) to release the SVC connection to the ATM member 11. The message is sent via the line terminating device 7 and is released by the signaling terminating function 3a in the active switch 2a.

The active signaling terminating function 3a performs the standard protocol procedure for the RELEASE message while referring to and updating the SVC protocol information A stored in the storage medium 6a, and converts the message into a "call release indication" signal, and sends it to the call process control function 4a.

In response to the call release indication signal, the call process control function 4a releases the internal resource, which is assigned to the SVC connection established between the ATM member 10 and the active switch 2a, updates the internal information B in the storage medium 6a, disassociates the SVC connection between the ATM member 10 and the active switch 2a from the SVC connection between the ATM member 11 and the active switch 2a, and updates the routing setting in the active switch 2a.

At the same time, the active process control function 4a deletes the released SVC connection C from the storage medium 6a, and sends the deletion information with a command to delete the call connection information through the information exchange device 9 to the standby call process control function 4b.

The call process control function 4a sends a call release request signal to the signaling terminating function 5a which is connected to the associated ATM member 11.

The signaling terminating function 5a terminates the call release request signal, executes the standard SVC protocol procedure while referring to and updating the SVC protocol information C stored in the storage medium 6a, converts the signal into a RELEASE message, and sends it to the line terminating device 8.

The line terminating device 8 sends the RELEASE message to the ATM member 11. On reception of the RELEASE message, the ATM member 11 recognizes the release of the SVC connection and stops sending and receiving information through the connection.

The standby call process control function 4b receives the command to delete the call connection information, which is sent from the active call process control function 4a, performs the routing in the standby switch 2b based on the SVC connection information C, and deletes the SVC connection information from the storage medium 6b.

Then, even when the switching from the active system to the standby system occurs, the SVC connection does not exist because the routing setting in the switch 2b, which was initially in the standby state, is identical to that in the switch 2a which was initially active.

Thus, the termination of the service to send the ATM information through the SVC connection can be maintained, and the service is not started. While the SVC protocol information A and A' and the internal resource information B in the storage medium 6a are continuously updated by the signaling terminating functions 3a and 5a, the update is not sent to the standby system.

The update information is not necessary once the SVC connection is released. Therefore, when the switching to the standby system which does not receive the update information occurs, there is no effect on the established SVC connection.

A modification of the present invention will now be explained.

Figure 5:
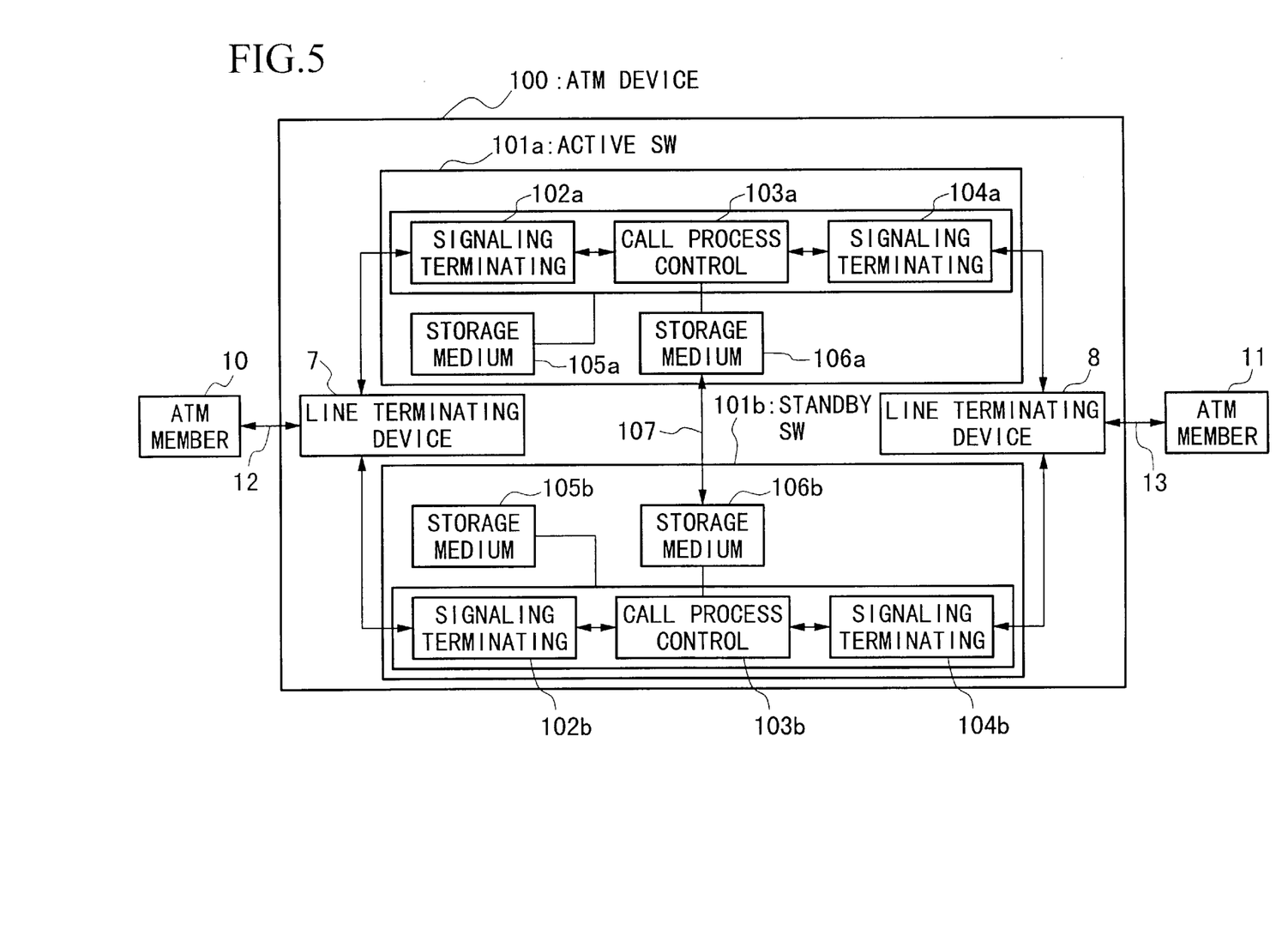
FIG. 5 is a block diagram showing the other embodiment of the present invention.

FIG. 5 is a diagram showing the second embodiment of the present invention. In FIG. 5, the second embodiment comprises the ATM device 100 controlled by the program, the line terminating devices 7 and 8, the switches 101a and 101b, the signaling terminating functions 102a, 102b, 104a, and 104b, the call process control functions 103a and 103b, first storage media 105a and 105b, second storage media 106a and 106b, and the information exchange device 107 between the active switch 102a and the standby switch 102b.

The ATM device 100 includes the line terminating devices 7 and 8, the switches 101a and 101b, and the information exchange device 107 between the active system and the standby system. The switch 101a includes the signaling terminating function 102a and 104a, the call process control function 103a, the first storage medium 105a, and the second storage medium 106a. The switch 101b includes the signaling terminating function 102b and 104b, the call process control function 103b, the first storage medium 105b, and the second storage medium 106b.

The first storage media 105a and 105b in the switches are referred to and updated by the signaling terminating functions 102a, 102b, 104a, and 104b and by the call process control functions 103a and 103b. The second storage media 106a and 106b are referred to and updated by the call process control functions 103a and 103b. The line terminating devices 7 and 8 are connected to the ATM members 10 and 11 through the lines 12 and 13.

Figure 6:
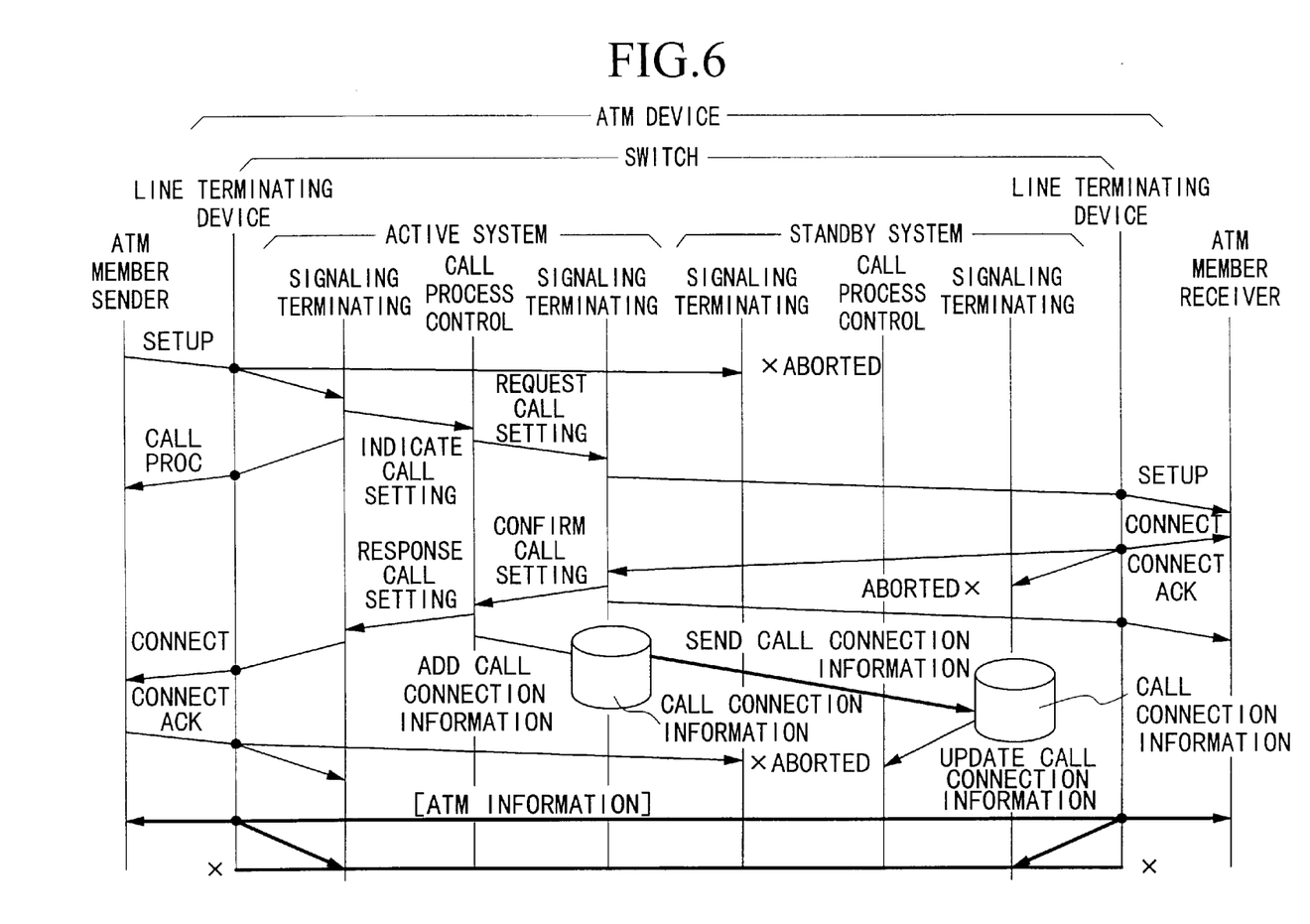
FIG. 6 is a diagram showing the first sequence for explaining the operation of the other embodiment of the present invention.
Figure 7:
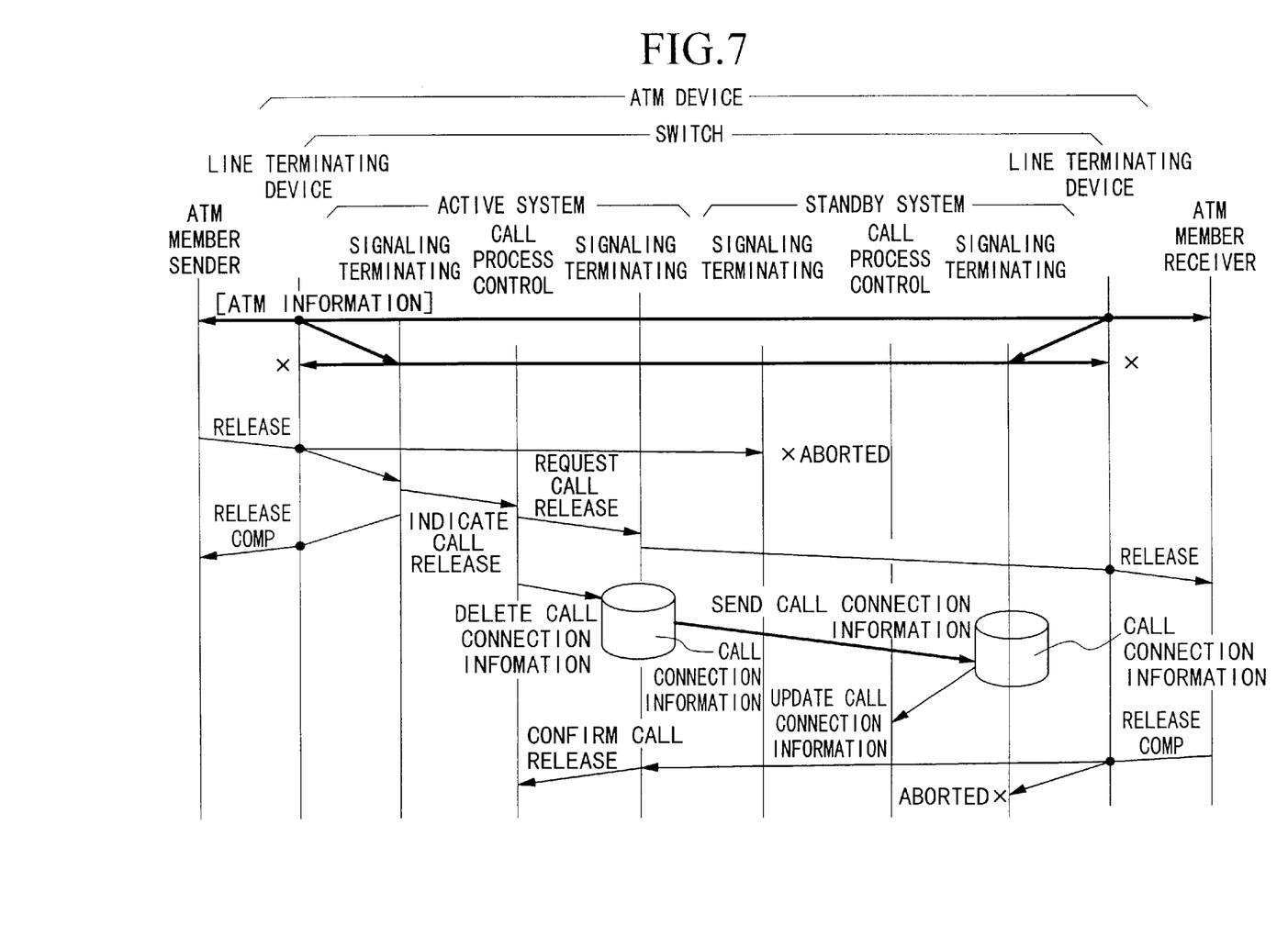
FIG. 7 is a diagram showing the second sequence for explaining the operation of the other embodiment of the present invention.

FIGS. 6 and 7 are sequence diagrams showing the operation of the second embodiment. The operation will be explained below with reference to FIGS. 5 to 7.

The ATM device 100 establishes or terminates the SVC connection in response to the request from the ATM members 10 and 11.

The line terminating devices 7 and 8 receive the ATM information, which includes the signaling information, from the ATM members 10 and 11 through the lines 12 and 13, send the ATM information to both active and standby switches 101a and 101b. Also, the line terminating devices 7 and 8 receive the ATM information with the signaling information from both active and standby switches 101a and 101b, and send the ATM information only from the active switch 101a through the lines 11 and 13 to the ATM members 10 and 11.

The switches 101a and 101b route the ATM information with the signaling information from the ATM members 10 and 11 based on the header information included therein.

The signaling terminating functions 103a, 103b, 105a, and 105b perform the terminating process for the signals according to the signaling protocol, which is defined in ITU-T Q.2931 or ATM FORUM UNI, for the ATM members 10 and 11.

The call process control functions 103a and 103b associate two of the signaling terminating functions 102a, 102b, 104a, and 104b based on the information which is contained in the SVC protocol message processed by the signaling terminating functions 102a, 102b, 104a, and 104b, and on the call setting signal which is internally defined beforehand. The active call process control function 103a stores the association information as the established or released SVC connection information in the second storage medium 106a, or deletes the information from the second storage medium 106a, and performs routing in the active switch 2a.

The active second storage medium 106a accepts the write access to add the call connection information from the active call process control function 103a, and transmits all the contents in the second storage medium 106a to the second storage medium 106b through the information exchange device 107.

The standby storage medium 106b accepts the write access by the transmission of the information, and sends the update of the call connection information to the standby call process control function 103b. On reception of the update of the call connection information, the standby call process control function 103b updates the routing in the standby switch 101b.

As described above, the present invention has the effects described below.

The first advantage is that, even when, in the ATM switching device or other ATM device with the dual switches, switching between the active and standby systems arises for some reasons, i.e., due to an accident in the switch, the transmission of the ATM main signal information through the SVC between the ATM members can be maintained without any interruption. This improves the reliability of the ATM network service using the ATM switching device or the ATM concentrator.

This advantage is achieved because the SVC connection information is transmitted at the time of the establishment or release of the SVC from the active switch to the standby switch, and the active switch and the standby switch have the same routing setting information and the SVC connection information in a real-time manner.

As the second advantage, even when the number of calls or the number of SVC connections increases, the data transfer is carried out between the active and standby systems, preventing the degradation of the call process performance.

This advantage is achieved because the information exchanged between the active and standby systems is not all the internal resource information which includes the SVC protocol information and the SVC connection information, but only the SVC connection information, and an additional process is not required. Further, the data exchange between the active and standby systems is performed, not at the time of change in status of the SVC, but at the time of the establishment or release of the SVC.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A dual SVC system for an ATM device, an ATM switching device, or an ATM concentrator, having an active switch system and a standby switch system, for connecting ATM members through the SVC (switched virtual connection) and routing ATM information, wherein a device for sending SVC information from said active switch system to said standby switch system in a real-time manner is provided, and when switching from the active system to the standby system occurs, the transfer of the ATM information through the SVC is maintained without any interruption.

2. A system according to claim 1, wherein the SVC connection information is sent from said active switch to said standby switch at the time of establishment or termination of a call in said active switch system.

3. A dual SVC system for an ATM device with first and second line terminating devices for ATM members, an active switch system, and a standby switch system, for providing a ATM communication service to said ATM members, wherein said active and standby switch systems comprise: switches for routing ATM information which includes signaling information; first and second signaling terminating devices connected to said first and second line terminating devices; call process control devices; and storage devices, an information exchange device is provided between said active switch system and said standby switch system, said call process control device of said active switch system associates said signaling terminating devices according to information which is contained in an SVC protocol message processed by said signaling terminating device and to call setting signal information which is defined within the system and is stored in said storage device, said call process control device of said active switch system stores the association information in said storage device as established or released SVC connection information, performs routing in said active switch system, and sends the SVC connection information to said call process control device of said standby switch system through said information exchange device, said call process control device of said standby switch device perform routing in said standby system, based on the SVC connection information which is sent from said call process control device of said active switch device through said information exchange device, and stores the SVC connection information in said storage device of said standby-switch system.

4. An ATM device using dual SVC system with first and second line terminating devices for ATM members, an active switch section, and a standby switch section, wherein said active and standby switch sections comprise: switches for routing ATM information which includes signaling information; first and second signaling terminating devices connected to said first and second line terminating devices; call process control devices; and storage devices, said signaling terminating devices in said active switch system executes the SVC protocol procedure while referring to and/or updating SVC signaling information which is transferred between said ATM members, call control signal information defined in said call process control device, and SVC protocol information stored in said storage device of said active switch system, said signaling terminating devices of said standby switch system stops its process corresponding to the process executed by said signaling terminating device of said active switch system, said call process control device of said active switch system executes a call process while referring to and/or updating SVC signal information which is defined in said signaling terminating devices, internal resource information stored in said storage device, and SVC connection information, to thereby establish the SVC connections between one of said ATM member and said first signaling terminating device and between the other ATM member and said second signaling terminating device, or to thereby release the established SVC connections, said call process control device of said active switch system associates or disassociates the SVC connections between said ATM members and said active switch system, stores the association information in said storage device of said active switch system as the SVC connection information, performs the routing in said active switch system based on the SVC connection information, and sends the SVC connection information to said call process control device of said standby switch system through an information exchange device, the SVC connection information sent from said active switch system through said information exchange device is received by said call process control device of said standby switch, the routing in said standby switch system is performed based on the SVC connection information, and the SVC connection information in said storage device of said standby switch system is updated, and said active and standby switch systems have the same routing setting, and said storage devices of said active and standby switch systems have the same SVC connection information.

5. An ATM device according to claim 4, wherein, in said storage device of said active switch system, the SVC protocol information for said first and second signaling terminating devices, the internal resource information for said call process control device are stored and continuously updated, the SVC protocol information and said internal resource information are not sent to said standby switch system, at the time of the establishment or termination of the SVC connection, only the SVC connection information is transferred to said standby switch system through said information exchange device.

6. An ATM device according to claim 4, wherein in each of said active and standby switch systems, a first storage device which is referred to and/or updated by said first and second signaling terminating devices and said call process control device, and a second storage device which is referred to and/or updated by said call process control device, said call process control device of said active switch system updates data in said second storage device to the SVC connection information at the time of establishment or release of a call, as the data in said second storage device is updated, the updated data in said second storage device of said active switch system is transferred to said second storage device of said standby switch system, and said call process control device of said standby switch system updates the routing setting in the standby switch system.

7. An ATM device according to claim 4, wherein the SVC connection information includes connection number, line/call number of the ATM members, VPC/VCI information, and band information.

* * * * *